(No Model.)
B. L. STOWE.
APPARATUS FOR LINING HOSE.
No. 553,877. Patented Feb. 4, 1896.
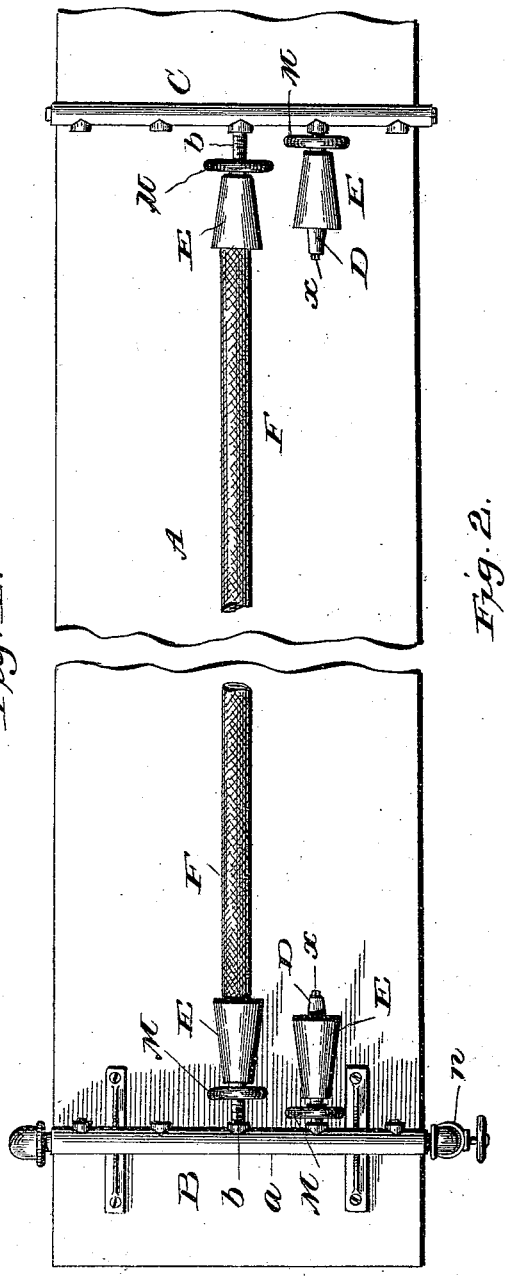
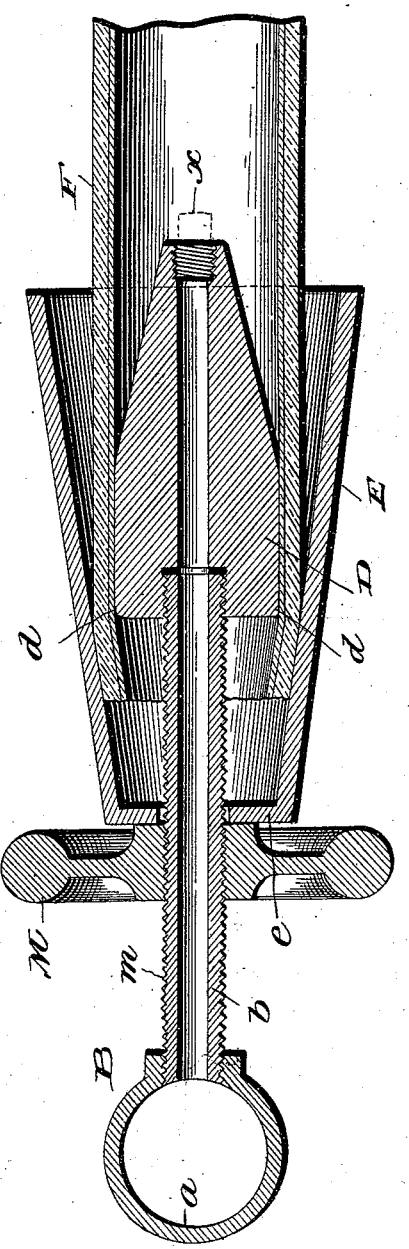
Witnesses:
L. C. Hills
J. B. Keefe
Inventor:
Benjamin L. Stowe,
by Marcus Bailey
his Atty.

UNITED STATES PATENT OFFICE.

BENJAMIN L. STOWE, OF JERSEY CITY, NEW JERSEY.

APPARATUS FOR LINING HOSE.

SPECIFICATION forming part of Letters Patent No. 553,877, dated February 4, 1896.

Application filed November 13, 1895. Serial No. 568,767. (No model.)

*To all whom it may concern:*

Be it known that I, BENJAMIN L. STOWE, of Jersey City, in the county of Hudson and State of New Jersey, have invented a certain new and useful Improvement in Apparatus for Lining Hose, of which the following is a specification.

My invention relates to apparatus for applying and securing rubber linings to hydraulic hose, and it refers particularly to the devices for securing the hose upon the nipples through which is admitted and discharged the heating agent (steam) by which the rubber lining is expanded and vulcanized to the body of the hose.

The invention will first be described by reference to the accompanying drawings, and will then be more particularly pointed out in the claims.

In the drawings accompanying and forming part of this specification, Figure 1 is a plan of so much of a hose steaming or lining table as needed for the purposes of explanation. Fig. 2 is an axial section, on enlarged scale, of one of the nipples and its appurtenances.

A is the "steaming-table," as it is termed. It may be of any suitable or preferred construction. At each end is a manifold B and C, the former for the steam admission, the latter for the steam discharge. Each manifold consists of a main-supply steam-pipe $a$, extending crosswise of the table, and branch pipes $b$ projecting therefrom horizontally at suitable intervals apart, and each branch pipe is provided with a nipple D of conical form, with its base secured to the branch pipe. The largest diameter of the conical nipple is slightly less than the internal diameter of the hose to be drawn over it. The manifolds are supported at a suitable height above the table-top by stands which may be adjustable lengthwise of the table. Mounted upon each branch pipe is a clamping device E consisting of a hollow frustum of a cone, the base of the frustum being to the front or next to the nipple. But one pair of these last-named devices is shown in Fig. 1, and in connection with the same is shown a section of hose F extending between and clamped upon its appropriate pair of nipples.

By reference to Fig. 2 it will be noted that the nipple back of its front end is provided with an annular external rib or shoulder $d$. This shoulder may be provided in various ways. I prefer to obtain it by making the rear face of the nipple flat and substantially at right angles to its sides and by inserting centrally into this flat face a branch steam-pipe $b$ of smaller diameter than the nipple, thus getting an annular shoulder at the rear end of the nipple, which is nearly if not quite square.

The hollow conical frustum E, which can move back and forth on the steam-pipe $b$ as a guide, has its base (which is next to the nipple) of larger internal diameter than the external diameter of the hose. Its smaller end is provided with a head $e$ perforated centrally for the passage of the steam-pipe, which it loosely fits, the diameter of the hole, however, being less than that of the nipple. The object of this construction is to prevent the cone from flying off in case the hose should accidentally blow off from the nipple while under steam-pressure. It also serves to guide and steady the cone while in use. The head $e$ also serves as a bearing-face against which can bear the running hand-nut M. This nut is mounted on the pipe $b$ and engages a screw-thread $m$ thereon, so that by turning the nut it can be moved toward or away from the cone E, according to the direction of its rotation.

To secure the hose in place, its end with the contained tubular rubber lining is drawn entirely over the nipple and a short distance beyond its shoulder $d$. The cone E is then drawn forward over the hose until it bends the inwardly-projecting end of the hose, and clamps the same between it and the shoulder $d$. The stress of the steam introduced into the hose in the steaming or vulcanizing operation may have the effect to some extent of increasing the grip of the cone on the hose; but practice has demonstrated that it is not safe to rely upon this, particularly with hose of large diameter. There is liability of leakage, and the hose is apt at times, owing to the great internal pressure to which it is subjected, to be drawn off with considerable force from the nipple. To prevent possibility of any such occurrence, I provide the running hand-nut M. By screwing this up tight against the head of the cone the latter is jammed up tight upon the nipple and over the hose, securing the latter with the utmost firmness in place and prescribing any possibility of the cone getting loose.

Steam is admitted to the manifold through a suitable main valve $n$. Frequently some of the nipples of the manifold are in use while others are not, and in order to cut out those not in use it has been customary heretofore to provide on each branch pipe $b$ an auxiliary valve for regulating the steam admission or discharge. The valve wears out rapidly and is apt to become leaky. To remedy this difficulty I dispense with the valve, and in lieu thereof employ a screw-plug $x$, which screws into the steam-hole in the smaller end of the nipple, which is tapped out for that purpose. Whenever it is desired to cut out any one of the nipples while using the others, the screw-plug is screwed into the nipple. By dispensing with the valve on the branch pipe $b$, I am also enabled to provide a sufficient running length for the hand-nut wheel M upon a short pipe.

Having now described my improvements, what I claim as new and of my own invention is—

1. In a hose-lining apparatus, the steam-pipe $b$ and conical nipple D over which the hose is drawn, secured at its base to the steam-pipe, in combination with the clamping-cone E adapted to pass large end foremost around the nipple from the rear thereof and having a guide and retaining-head $e$ which fits upon and around the pipe $b$ as and for the purposes hereinbefore shown and described.

2. In a hose-lining apparatus, the steam-pipe $b$ and conical nipple D over which the hose is drawn, secured at its base to the steam-pipe, in combination with the clamping-cone E adapted to pass large end foremost around the nipple from the rear thereof, and having a head $e$ which fits loosely upon the pipe $b$, and the running hand-nut M, mounted on the pipe $b$ in rear of the clamping-cone, and engaging a screw-thread on said pipe, as hereinbefore shown and described.

3. In a hose-lining apparatus, a manifold consisting of the main steam-pipe $a$ provided with steam-admission valve $n$, the branch pipes $b$, and conical hose-receiving nipples one for each pipe $b$, each secured by its base or larger end to its pipe, and having its front end provided with a removable screw-plug $x$ in combination with clamping-cones E adapted to pass large end foremost around the nipples from the rear thereof, and having heads $e$ which fit loosely upon the pipes $b$, and the running hand-nuts M, mounted on pipes $b$ in rear of the clamping-cones and engaging external screw-threads upon the said pipes, as hereinbefore shown and described.

In testimony whereof I have hereunto set my hand this 5th day of November, 1895.

BENJAMIN L. STOWE. [L. S.]

Witnesses:
  NATHAN STOWE,
  EVELYN NORRIS.